June 26, 1934.  C. F. OGREN  1,964,672
CLUTCH FACING
Filed Oct. 24, 1930
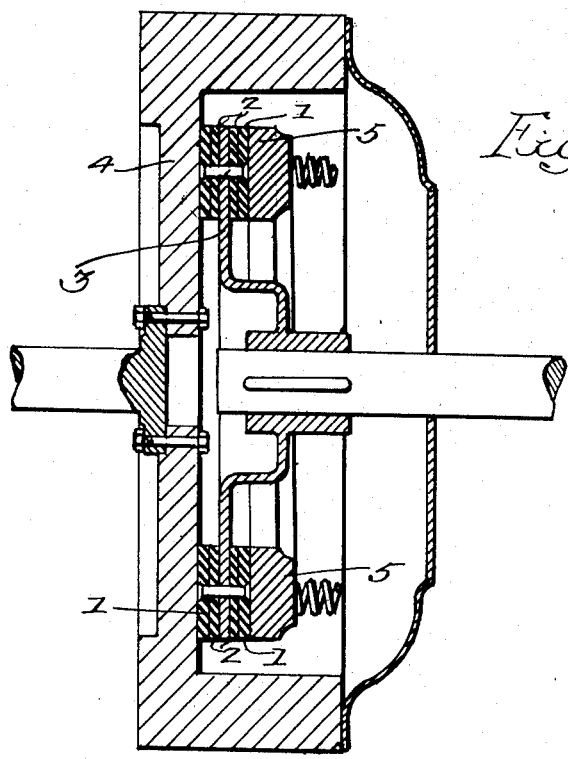
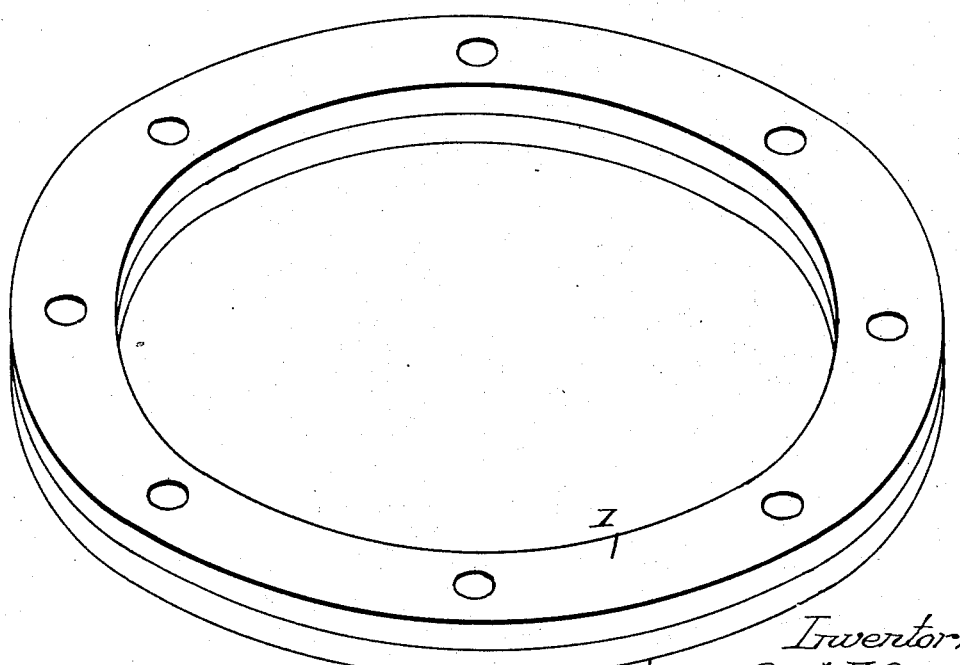
Inventor:-
Carl F. Ogren
by his Attorneys
Howson & Howson Patented June 26, 1934

1,964,672

UNITED STATES PATENT OFFICE 1,964,672

CLUTCH FACING

Carl F. Ogren, Trenton, N. J., assignor to Thermoid Rubber Company, Trenton, N. J., a corporation of New Jersey Application October 24, 1930, Serial No. 491,021

1 Claim. (Cl. 192—107)

This invention relates to improvements in clutch facings; and a principal object of the invention is to provide a facing that shall be generally more durable and efficient in operation than clutch facings made in accordance with the prior practice.

To this general end, another object of the invention is to provide a clutch facing having self-adjustable characteristics compensating for irregularities and slight misalignments of the opposed relatively movable clutch elements.

Still another object of the invention is to provide a clutch facing that will materially reduce the tendency of clutches to "grab" and give a cushioned, smooth engagement.

In the drawing, Figure 1 is a view in perspective of a clutch facing made in accordance with my invention; and Fig. 2 is a more or less diagrammatic sectional view of the facing as applied to a well known type of clutch.

Much of the difficulty heretofore experienced with clutch facings is due to the fact that the metal parts of the clutch are made with insufficient accuracy to afford perfect parallel alignment between the inter-engaging surfaces. This is especially true in the single plate and similar types of clutches now in common use. It has been suggested that the clutch facings be made relatively soft, to thereby overcome the undesirable effects of the aforesaid lack of alignment; but such facings when installed have proved undesirable by reason of a tendency to rapid wear deterioration. By my invention, I have produced a clutch facing which combines the desirable characteristics of the relatively soft facings with the durability and strength of the standard facings now commonly employed.

With reference to the drawing, a clutch facing made in accordance with my invention consists particularly of a composite member, one face 1 of which is relatively hard and rigid, having the physical characteristics, for example, of the more efficient clutch facings now commonly employed; while the other face 2 is relatively soft and preferably resilient. In a preferred embodiment, the relatively hard and soft portions of the disk may comprise respectively fifty per cent of the entire body, although this may be varied to any extent as may be found desirable. In another embodiment, the facing may be progressively graduated from the relatively hard material on one face to the relatively soft material at the opposite face. In these respects, therefore, there are to be no limitations.

In a molded clutch element employing a base of rubber composition, the physical differences at the opposite faces of the element may be attained by a judicious control of the amount of sulphur employed in the compositions constituting the opposite face portions. The invention is readily practiced in that method of manufacture known as sheeting or the surface accretion method, wherein the facings are cut from sheets built up by progressive feeding on suitable rollers. In this process the composition initially passed to the rollers may be of a character forming a dense relatively hard product; whereas the material fed to the rollers toward the end of the operation may be such as to produce a softer and more yielding product. By this method there is produced a sheet material consisting of an integral structure, one side face of which possesses relative strength and durability and is capable of withstanding abrasion by frictional contact with the clutch disks, while the other side is relatively soft and flexible and capable of conforming readily to the minor irregularities and misalignments commonly found in clutch construction.

The invention is not restricted to any particular type of clutch facing, or to any method of manufacture. It is applicable, for example, to the rubberized-fabric type of facing and may be practiced in that instance by cementing a relatively soft material to the back of the usual rubberized fabric facing. An article made in accordance with my invention may also be produced where rubberized fabric is used at the wearing surface by vulcanizing to the other face of the disk a pad of relatively soft resilient rubber.

The invention is also applicable to clutch facings employing resinous binders, such as the reaction product of phenol and formaldehyde, it being possible to modify the hard wear-resisting product ordinarily used by the introduction of suitable plasticizers, such for example as China-wood oil.

In Fig. 2 I have illustrated an application of the aforedescribed clutch facing to a clutch of a well known type. In this instance the clutch comprises a single plate 3 which is adapted to be confined between the opposed faces of the relatively movable clutch elements 4 and 5. To the opposite sides of the plate 3 may be secured in the usual manner, as by means of rivets, the facings made in accordance with my invention, the relatively soft and resilient surfaces 2 of the facings being secured against the opposite faces of the said plate, whereby the relatively hard and durable portions 1 of the facings are exposed to frictional engagement with the elements 4 and 5. It will be apparent that as the elements 4 and 5 are pressed toward each other, and against the facings, that the latter by reason of the resilient portions thereof will accommodate themselves to any irregularities in the opposed faces of the elements 4 and 5 and of the plate 3 and to any slight parallel misalignments of said elements, whereby the entire surface areas of the facings are brought into contact with and are held under substantially uniform pressures between the opposed clutch elements. It will further be noted that by reason of the relatively hard and strong outer portions 1 of the facings that the rivets or other elements securing the facings to the plate 3 will have a strong backing, preventing tearing away of the facings from the plate to which they are secured.

By the foregoing invention I have provided a clutch facing which not only possesses the strength and durability and wear-resisting qualities of the relatively hard facings now commonly employed, but which possesses in addition a self-adjusting, self-aligning characteristic which by compensating for minor irregularities in the associated clutch elements overcomes the uneven wear and lack of efficiency frequently found in the clutches of the prior practice.

I claim:

A clutch facing element for use in disk clutches wherein transmission of power is effected by frictional pull exerted over and substantially in the plane of a face of said element, said facing comprising a unitary integral element having opposite side surfaces differing predeterminedly as to hardness and each having a dense substantially homogeneous composition capable of withstanding the relatively high heat conditions produced by friction between the interengaging parts.

CARL F. OGREN.